B. N. TRAUTMAN.
RIDDLE FOR SEED EXTRACTING MACHINES.
APPLICATION FILED APR. 12, 1920.

1,378,736.

Patented May 17, 1921.
4 SHEETS—SHEET 1.

WITNESSES

B. N. Trautman, INVENTOR,

BY

ATTORNEY

B. N. TRAUTMAN.
RIDDLE FOR SEED EXTRACTING MACHINES.
APPLICATION FILED APR. 12, 1920.

1,378,736.

Patented May 17, 1921.
4 SHEETS—SHEET 3.

WITNESSES
Howard D. Orr
Philip E. Siggers

B. N. Trautman, INVENTOR,
BY E. G. Siggers
ATTORNEY

B. N. TRAUTMAN.
RIDDLE FOR SEED EXTRACTING MACHINES.
APPLICATION FILED APR. 12, 1920.
1,378,736.
Patented May 17, 1921.
4 SHEETS—SHEET 4.
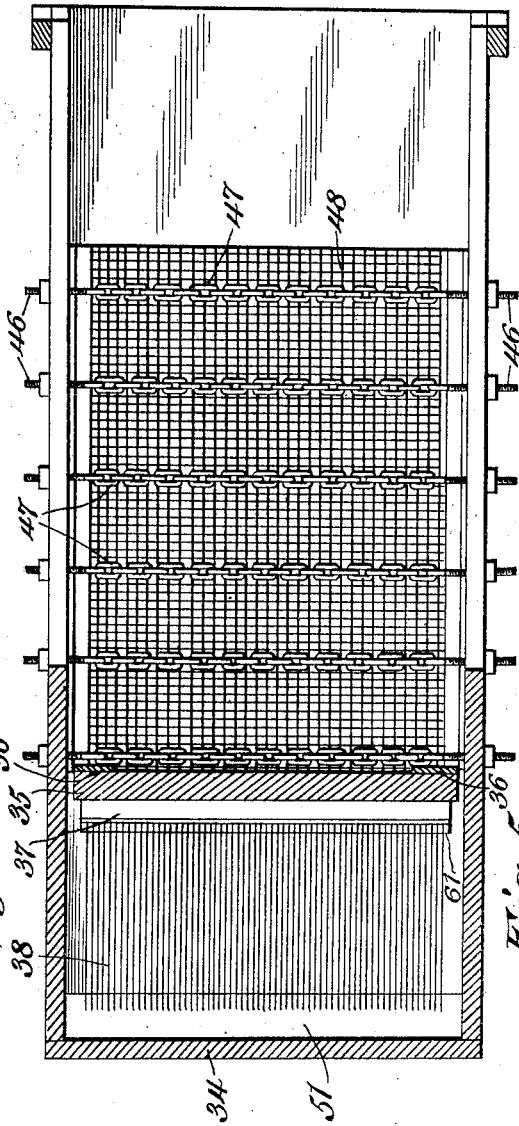
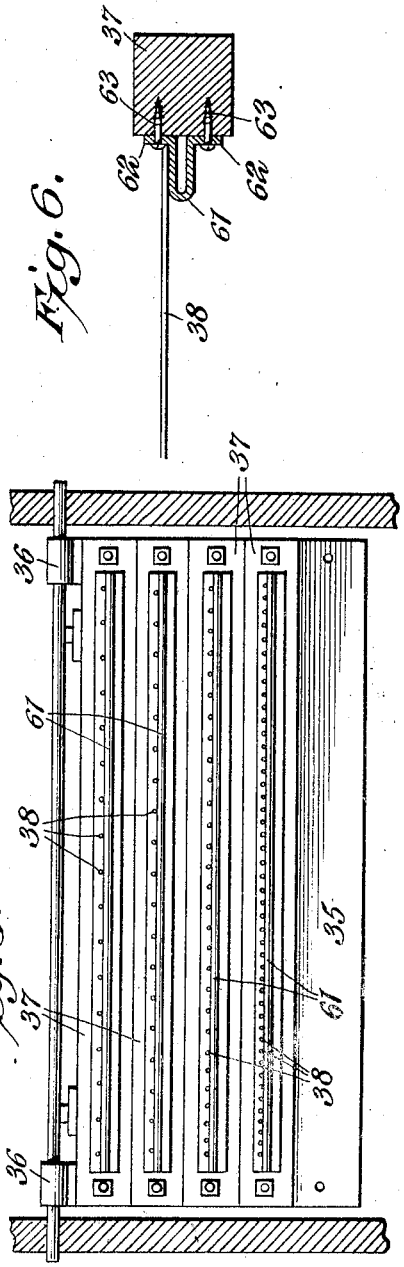
WITNESSES
Howard D. Orr.
Philip E. Siggers
B. N. Trautman, INVENTOR,
BY E. G. Siggers
ATTORNEY

UNITED STATES PATENT OFFICE.

BURL N. TRAUTMAN, OF FORT COLLINS, COLORADO.

RIDDLE FOR SEED-EXTRACTING MACHINES.

1,378,736. Specification of Letters Patent. Patented May 17, 1921.

Application filed April 12, 1920. Serial No. 373,331.

*To all whom it may concern:*

Be it known that I, BURL N. TRAUTMAN, a citizen of the United States, residing at Fort Collins, in the county of Larimer, and State of Colorado, have invented a new and useful Riddle for Seed-Extracting Machines, of which the following is a specification.

This invention relates to riddles for seed extracting machines.

The principal object of the invention is to provide an improved riddle for machines adapted to extract seeds from fruits and vegetables of all kinds, such a riddle operating in conjunction with a crusher which first breaks open the fruits or vegetables and then delivers the crushed material by gravity down upon the riddle beneath.

The special object of the invention is to provide improvements in riddles of the character described and claimed in my Patent No. 1,266,641, dated May 21, 1918.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Fig. 4 is a longitudinal section on the line 4—4 of Fig. 1.

Fig. 5 is a detail showing a portion of the pulp-separating means.

Fig. 6 is a detail in cross section of the mounting of one of the spring prongs which goes to make up the pulp-separating means shown in Fig. 5.

An improvement in crushers for seed extracting machines is described and claimed in an application filed of even date herewith, Serial No. 373,332.

Figure 1:
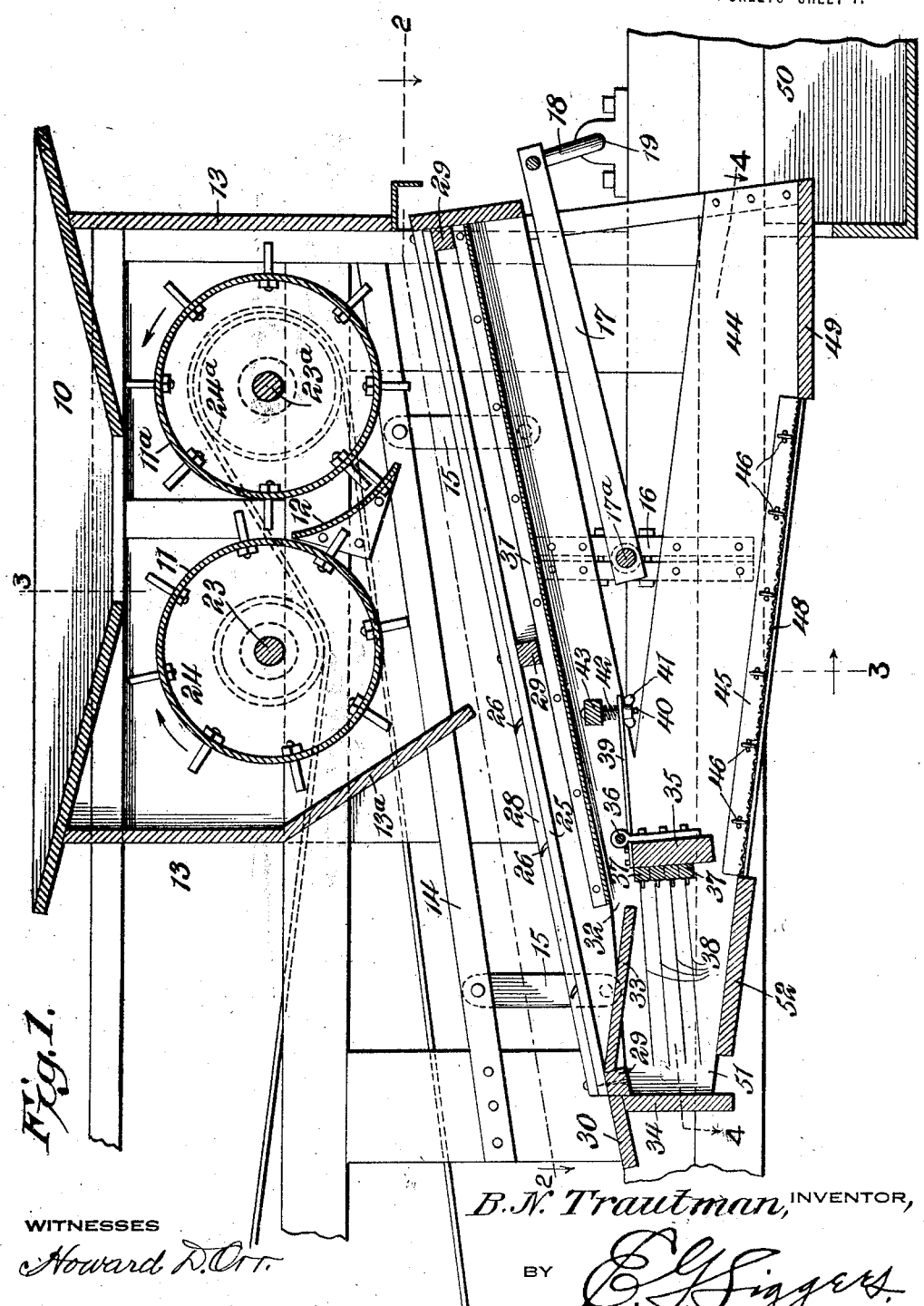
Figure 1 is a vertical sectional view through the principal portions of my seed extracting machine showing the riddle associated with an improved type of crusher.
Figure 2:
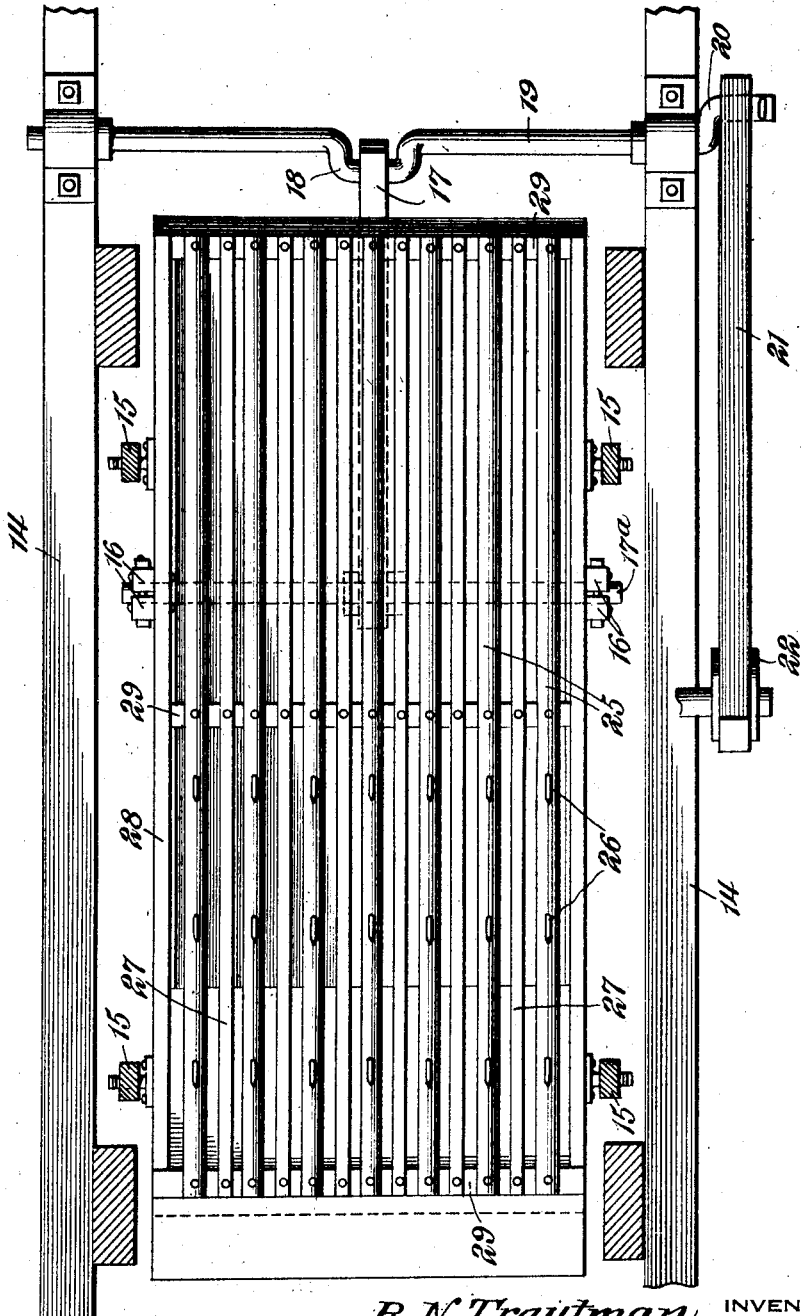
Fig. 2 is a horizontal sectional view on the line 2—2 of Fig. 1.
Figure 3:
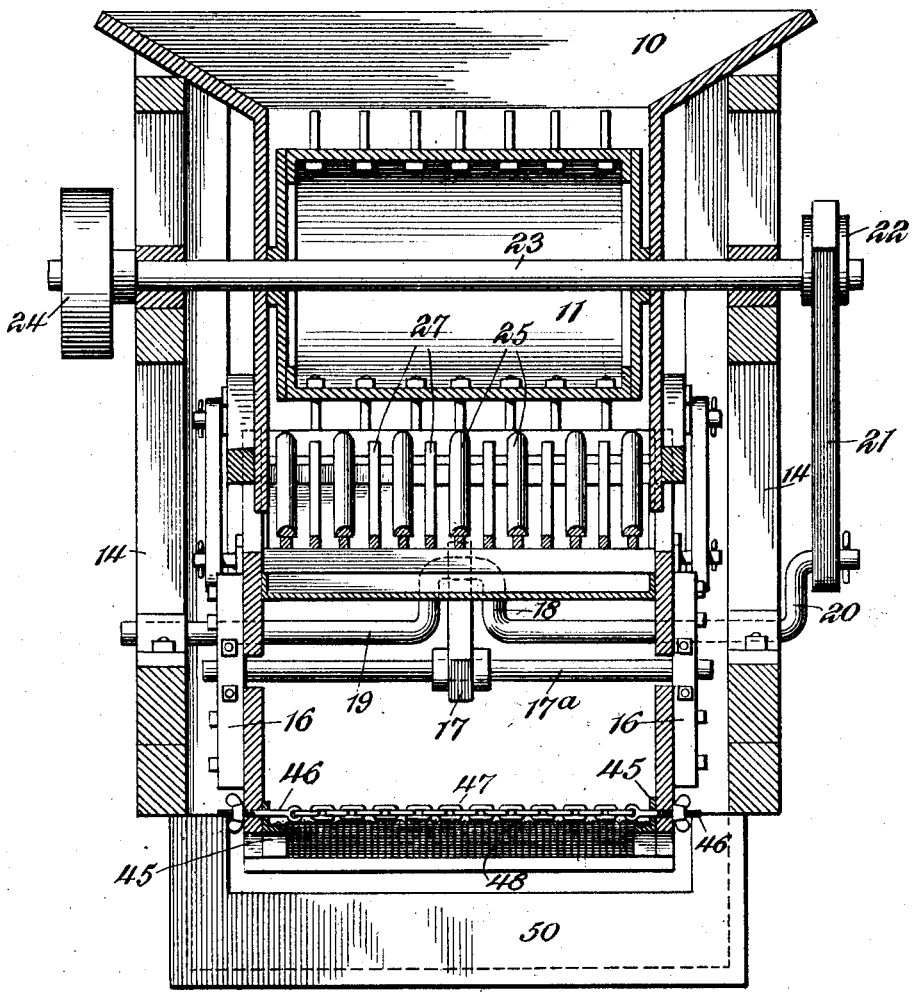
Fig. 3 is a vertical transverse section on the line 3—3 of Fig. 1.

The machine illustrated in Fig. 1 shows in a general way the improved crusher for which an application has been filed as just noted. This crusher includes a hopper 10, crushing rolls 11, 11$^a$ mounted in a crushing compartment 13 immediately below the hopper 10, a combined cleaning plate and deflector 12 mounted below the crushing rolls but between the same, and an inclined wall 13$^a$ provided on the lower part of the crushing compartment. The deflector plate 12 in conjunction with the rotary crushing rolls delivers the crushed fruits or vegetables upon the upper end of a slat riddle to be described. A main frame 14 supports the crusher and the riddle and holds the principal parts of the machine in operative position. This frame 14 has links 15 pivotally mounted thereon, which links at their lower ends are pivotally connected with a slat riddle.

The slat riddle is rectangular in plan comprising the sides 28 and cross pieces 29 joined thereto. Running longitudinally of the slat riddle are slats 25 and 27 which are protected against wear by metallic reinforcing which will be spoken of later. The slats 25 have a greater width and a greater height than the slats 27, as shown, and on their lower portions are fingers 26. The portion of the slat riddle directly beneath the opening at the bottom of the crushing compartment does not have the fingers 26 but the lower portion of each slat 25 carries a plurality of these fingers whose points are turned in the same direction as that toward which the riddle itself is inclined. When the riddle is oscillated, these fingers push the larger pieces down the incline of the riddle and prevent said pieces from returning with each upward movement of the riddle. The slats 25 and 27 are parallel to each other, as shown, and are spaced a sufficient distance so that all the seeds, the smaller particles of pulp and the juices will fall upon a pan 31 below. This pan 31 is fixed directly underneath the slat riddle and extends entirely across underneath the slats so as to catch all products not retained by the slat riddle. A chute 30 provided on the riddle is a substantial continuation of the slats thereof, which chute may lead to any convenient receptacle or permit dumping of the material directly on the ground.

The pan 31 stops short of the lower end of the slat riddle thus providing a passageway 32, which passageway is partly closed by deflector plate 33. That end of the deflector plate 33 remote from the lower end of the pan 31 is secured to the lowermost cross piece 29. The other end of the deflector plate is spaced a short distance from the lower end of the pan 31. Through this space the seeds, the smaller particles and the juices will fall. Because the inclination of the deflector plate 33 is opposite to the inclination of the pan 31, it will be clear that the material deposited upon the deflector plate will move downwardly to the passageway 32. The shaking of the riddle will aid in this downward movement. The seeds, the pulp particles and shreds, and the juices will fall upon a separator mounted below the passageway 32.

Directly beneath this delivery space is another separating means including a block 35 hinged, as at 36, so as to swing about a horizontal axis on the riddle. A series of gratings formed of wire prongs 38 are secured by cross pieces 37 to the block 35. An arm 39 is connected with the block 35 on that side opposite to where the prongs 38 are mounted, and this arm 39 has a suitable perforation to fit over the end of a bolt 40. The bolt 40 is held by a strip 43 and a spring 42 is interposed between the outer end of arm 39 and the strip. A wing nut 41 on the bolt regulates the tension of the spring 42 upon said arm. The separator being hinged by elements 36, and the prongs 38 being of more or less resilient wire, it will be clear that there will be a very considerable vibration set up in these prongs when the riddle is being operated in the customary manner. The amount of vibration of the spring prongs may be varied to an extent by adjusting the tension of spring 42. The spring prongs of the uppermost row in this separator are spaced farther apart than the spring prongs of the next lower row, and so on. While four of these rows of spring prongs are shown, any number may be used, it being understood that the various rows are removable so as to vary the size of the pulp particles separated from the seeds.

When the smaller particles of pulp, the juices and the seeds fall down upon the separator which has just been described, the prongs will permit the seeds and the juices to fall upon a plate 52 below, but the particles of pulp, especially the stringy portions thereof, will be deflected by these rows of prongs and because of their vibration and inclination, as illustrated in Fig. 1, the pulp particles or shreds will travel down to the ends of the prongs and there fall below. A wall 34 faces the ends of the prongs and directs the material which the prongs will not pass out through a passageway 51, the latter being provided between the plate 52 and the wall 34.

There will be some particles of pulp dropped upon the separator which are even smaller than the seeds themselves. Such particles will fall upon the plate 52 along with the seeds and juices. The vibration of the riddle causes these very fine particles of pulp, along with the seeds and juices, to pass downwardly along the inclined plate 52 to a screen member 45 provided in an opening in a lower riddle member 44. The bottom of this screen member 45 is made up of wire fabric 48. Between the sides of the screen separator 45 chains 47 extend, such chains being secured at each end to adjusting elements 46 which pass through the sides of the screen for permitting the slack in said chains to be varied at will. These chains have a length approximating the width of the screen and extend substantially parallel to each other when the machine is idle. When the separator is in operation the chains strike the screened surface because of the oscillation of the riddle and beat the surface of the wire fabric 48, pounding the fine pulp particles into still smaller bits, all of which will ultimately pass through the wire screen before the lower end thereof is traversed. The juices, of course, pass out through the wire fabric 48. At the lower end of the screen separator a level seed-receiving section 49 is provided which permits delivery of the seeds free from practically all foreign matter into a suitable receptacle 50.

The means for effecting oscillation of the riddle may take any form. In the present instance, guides 16 are provided on either side of the riddle, which guides adjustably hold the end of a cross-rod 17$^a$. To the cross-rod 17$^a$, a pitman 17 is pivotally connected, the other end of the pitman being pivotally connected to the crank 18 provided on a transverse shaft 19. The shaft 19 is mounted in bearings upon the main frame and has a crank end 20 pivotally connected with a pitman 21. An eccentric or cam 22 provided on a shaft 23 offers convenient means by which the pitman 21 may turn the shaft 19 and with it the pitman 17, so that the riddle will oscillate. The shaft 23 may be also the shaft upon which one of the crushing rolls 11 is mounted and it may carry a pulley 24 at the end opposite from the cam 22, whereby the entire machine may be operated. A belt drive or any other convenient form of power delivering means is employed to connect the pulley 24 with an engine. The other crusher roll 11$^a$ has a pulley 23$^a$ secured to a shaft 23. The amount of swing of the riddle may be varied by adjusting the vertical position of the rod 17ª along the slotted guide 16.

Figure 7:
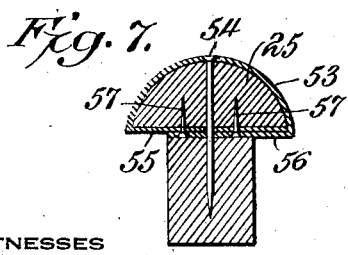
Figs. 7 and 8 are detail cross sections showing the manner of reinforcing the two kinds of slats used in the improved riddle.
Figure 8:
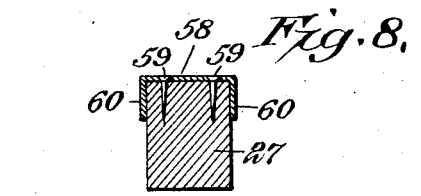

As seen in Figs. 7 and 8, each slat 25 includes a rectangular portion and a portion semi-circular in cross section, the latter portion being protected from wear and tear by the metallic sheathing or reinforcing 53, nails 54 or the like holding this sheathing in place. The ends of the sheathing 53 are tucked inwardly under the semi-circular head portion as indicated at 55 and 56, and tacks or like elements hold these tucked ends in place. The slats 27 are rectangular and are not so high as the slats 25. Here a metallic sheathing 58 is provided, having tacks 59 to hold it in position, and side flanges 60.

In Fig. 6, the manner in which the wire prongs are mounted upon the cross pieces 37 is illustrated. Each prong 38 is permanently connected with a crimped metallic sheet 61 having flanges 62 whereby convenient fastening elements 63 will hold the sheet upon its cross piece 37; thus the prongs are supported for a short distance out from the cross pieces.

What is claimed is:—

1. In a riddle, a series of rigid slats spaced from each other but parallel and slanting, fingers provided on alternate slats and pointed downwardly in the direction of the slant of the slats, those slats having the fingers rising above the other slats, and means beneath the slats for catching all material which finds its way between the slats.

2. In a riddle, a series of parallel slats slanting downwardly, each alternate slat having a rounded upper portion, the other slats being rectangular in cross section, all the slats being protected by a sheathing, the slats having the rounded upper portions being provided with fingers on the lower halves thereof, and means beneath the slats for catching all material which finds its way between the same.

3. In a vibratory riddle, a series of spaced parallel slats slanting downwardly and fixed upon the upper portion of the riddle, a chute on the riddle below the lower ends of the slats, a slanting pan located beneath the slats and extending for the greater portion of their length, said pan stopping short of the lower ends of the slats and there providing a discharge opening, a deflecting element located in this opening and slanting downwardly, the slant of the deflecting element being opposite to that of the pan, and means located below the deflecting plate for causing further separation of material.

4. In a riddle for the purpose described, means for separating the larger pieces of crushed material from the seeds, and additional means for separating the finer pieces therefrom, said second-named means including a movably mounted member directly beneath the delivering portion of the first-named means, said member carrying a plurality of rows of resilient prongs.

5. In a riddle for the purpose described, means for separating the larger pieces of crushed material from the seeds, and additional means for separating the finer pieces therefrom, said second-named means including a movably mounted member directly beneath the delivering portion of the first-named means, said member carrying a plurality of removable cross pieces, each cross piece supporting a row of resilient prongs, the prongs of each row being closer together than the prongs of the row next above and all the prongs having a downward slant.

6. In a riddle for the purpose described, means for separating the larger pieces of crushed material from the seeds, and additional means for separating the finer pieces therefrom, said second-named means including a swingably mounted member directly beneath the delivering portion of the first-named means, said member being mounted to vibrate about a horizontal axis transverse of the riddle, and a plurality of rows of resilient prongs one beneath the other carried by said member.

7. In a riddle for the purpose described, means for separating the larger pieces of crushed material from the seeds, and additional means for separating the finer pieces therefrom, said second-named means including a swingably mounted member directly beneath the delivering portion of the first-named means, said member carrying a plurality of resilient prongs and having an arm fixed thereto and extending therefrom in a direction opposite to that in which the prongs extend, resilient means acting upon the outer end of said arm to cushion the swings thereof and means for adjusting the tension of said resilient means.

8. In a vibratory riddle, a separating member comprising a block hingedly mounted transversely of the riddle, a plurality of prongs mounted on one face of the block, an arm extending from the opposite face thereof and substantially at right angles thereto, and means provided on the riddle and engaging with the free end of said arm for varying the position of the block with respect to its hinge axis and for restraining movement of said arm.

9. In a vibratory riddle for the purpose described, means for separating the larger pieces of crushed material from the seeds, a delivery opening provided at the lower end of said means, a deflecting plate mounted in said opening, means for separating the finer pieces from the seeds mounted directly below the deflecting plate, the second-named means carrying a plurality of prongs, a vertical wall spaced from the outer end of said prongs, an inclined plate located below the prongs, and a discharge opening provided between said wall and said plate, said opening lying below the ends of the prongs.

10. In a riddle for the purpose described, a series of parallel and slanting slats, means mounted below the slats to catch material finding its way between the slats, a discharge opening provided at the lower end of said means, a movably mounted pronged member located below said delivery opening, and a second delivery opening located directly beneath the ends of the prongs.

11. In a riddle for the purpose described, a series of parallel and slanting slats, means mounted below the slats to catch material finding its way between the slats, a discharge opening provided at the lower end of said means, a movably mounted pronged member located below said delivery opening, a second delivery opening located directly beneath the ends of the prongs, means for catching all material which finds its way between the prongs, and a screen member carrying beater chains connected with the last-named means.

12. In an oscillatory riddle for the purpose described, a movably mounted member for separating material, said member carrying a plurality of prongs at an angle to the horizontal, said prongs each being secured at one end and free to vibrate at the other end, means for delivering crushed material upon said prongs near the fixed ends thereof, means for varying the inclination of said prongs, and means associated with the last mentioned means for varying the amount of vibration of the prongs.

13. In a riddle, a series of parallel slats slanting downwardly, each alternate slat having a rounded upper portion, the other slats being rectangular in cross section, the rounded slats rising above the other slats, all the slats being secured on the same level to the riddle, a sheathing protecting all the slats, and a pan parallel to slats and beneath the same for catching all material which finds its way between the slats.

14. In a riddle, a series of parallel rigid slats slanting in one direction, alternate slats being higher than the other slats and having a rounded upper portion, the other slats having flat upper faces, bent fingers on top of the higher slats projecting therefrom in the direction of the downward slant of the slats, said fingers being disposed only on the lower portions of the length of the slats.

15. In a riddle, a series of parallel slats slanting downwardly, each alternate slat having a rounded upper portion, the other slats being rectangular in cross section, all the slats being protected by a sheathing, the slats having the rounded upper portions being provided with rigid fingers projecting therefrom, and means beneath the slats for catching all material which finds its way between the same.

16. In an oscillatory riddle, means for separating the stringy portions of crushed fruits and vegetables comprising a member mounted beneath an opening provided in said riddle, said member being so supported that it vibrates through a small arc when the riddle oscillates but has no movement independent of the riddle, and a plurality of resilient prongs carried by the member and disposed so as to act upon all material dropping by gravity through said opening.

17. In a riddle, means for separating the stringy portions of crushed fruits and vegetables comprising a swingably mounted member placed beneath an opening provided in said riddle, means for mounting said member so as to vibrate about a horizontal axis, means connected to said member for cushioning the vibratory movements thereof, and a plurality or resilient prongs supported at one end by said member.

18. In a riddle, means for separating the stringy portions of crushed fruits and vegetables comprising a swingably mounted member placed beneath an opening provided in said riddle, means for mounting said member so as to vibrate about a horizontal axis, an arm projecting from said member, resilient means acting upon said arm to cushion the swing of said member, and a plurality of resilient prongs carried by said member.

19. In a riddle, means for separating the stringy portions of crushed fruits and vegetables comprising a swingably mounted member placed beneath an opening provided in said riddle, means for mounting said member so as to vibrate about a horizontal axis transversely of the riddle, and a plurality of resilient prongs carried by said member, said prongs being arranged in rows one beneath the other.

20. In a riddle, means for separating the stringy portions of crushed fruits and vegetables comprising a swingably mounted member placed beneath an opening provided in said riddle, means for mounting said member so as to vibrate about a horizontal axis, and a plurality of resilient prongs carried by said member, said prongs being arranged in rows one beneath the other, with the prongs of each row disposed closer together than the prongs of the row next above.

21. In a riddle, means for separating the stringy portions of crushed fruits and vegetables comprising a swingably mounted member placed beneath an opening provided in said riddle, means for mounting said member so as to vibrate about a horizontal axis, a plurality of resilient prongs carried by said member, and means for supporting the prongs for a short distance from their point of attachment to the member, the outer ends of the prongs being free and the member being so disposed that all the prongs have a downward slant.

22. In a riddle, means for separating the stringy portions of crushed fruits and vegetables comprising a swingably mounted member placed beneath an opening provided in said riddle, means for mounting said member so as to vibrate about a horizontal axis, a plurality of resilient prongs carried by said member, said prongs being arranged in rows one beneath the other with the prongs of each row disposed closer together than the prongs of the row next above, the outer ends of all the prongs being free, said member holding the prongs so that they all have a downward slant, and means for supporting the prongs for a short distance from the point of attachment to said member.

In testimony that I claim the foregoing as my own, I have hereto affixed my signature.

BURL N. TRAUTMAN.